US007855162B2

(12) United States Patent
Daniel Doni et al.

(10) Patent No.: US 7,855,162 B2
(45) Date of Patent: *Dec. 21, 2010

(54) NEEDLE-SHAPED CERAMIC BODY, NEEDLE-SHAPED CERAMIC CATALYST BODY AND METHOD FOR PRODUCING SAME

(75) Inventors: Jayaseelan Daniel Doni, Nagoya (JP); Hideki Kita, Nagoya (JP); Naoki Kondo, Nagoya (JP); Shunkichi Ueno, Nagoya (JP); Tatsuki Ohji, Nagoya (JP); Shuzo Kanzaki, Nagoya (JP); Kazuhiko Koike, Kariya (JP); Takumi Suzawa, Kariya (JP); Tomohiko Nakanishi, Nishio (JP)

(73) Assignees: National Institute of Advanced Industrial Science and Technology, Tokyo (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 974 days.

This patent is subject to a terminal disclaimer.

(21) Appl. No.: 10/582,957

(22) PCT Filed: Dec. 13, 2004

(86) PCT No.: PCT/JP2004/018572

§ 371 (c)(1),
(2), (4) Date: Feb. 21, 2007

(87) PCT Pub. No.: WO2005/056180

PCT Pub. Date: Jun. 23, 2005

(65) Prior Publication Data

US 2007/0254804 A1    Nov. 1, 2007

(30) Foreign Application Priority Data

Dec. 15, 2003 (JP) .............................. 2003-417165
Feb. 27, 2004 (JP) .............................. 2004-055293
Nov. 1, 2004 (JP) .............................. 2004-318609

(51) Int. Cl.
*B01J 23/00* (2006.01)
*B01J 21/00* (2006.01)
*B01J 20/00* (2006.01)

(52) U.S. Cl. ........................ 502/439; 502/251; 502/252; 502/263; 502/304; 502/407; 502/415

(58) Field of Classification Search ................. 502/251, 502/263, 304, 407, 415, 439
See application file for complete search history.

(56) References Cited

U.S. PATENT DOCUMENTS 5,158,916 A * 10/1992 Claussen .................... 264/639

(Continued)

FOREIGN PATENT DOCUMENTS

JP        49 129704         12/1974

(Continued)

*Primary Examiner*—Cam N Nguyen
(74) *Attorney, Agent, or Firm*—Oblon, Spivak, McClelland, Maier & Neustadt, L.L.P.

(57) ABSTRACT

The present invention provides a needle-shaped ceramic body and needle-shaped ceramic catalyst body in which a base material is a high specific surface area porous cordierite body that is stable at high temperatures, and also provides methods of producing this needle-shaped ceramic body and needle-shaped ceramic catalyst body. The present invention relates to a needle-shaped ceramic body and needle-shaped ceramic catalyst body in which a base material is a high temperature-stable, high specific surface area porous cordierite body comprising a porous structure having a prescribed porosity and formed of a needle-shaped cordierite crystal phase, and further relates to methods of producing this needle-shaped ceramic body and needle-shaped ceramic catalyst body, and by using porous cordierite constituted of needle-shaped crystals as a catalyst-supporting honeycomb structure, the present invention is able to inhibit sintering-induced reduction in the specific surface area. Since a honeycomb can be directly produced as the cordierite sinter itself, an inexpensive product can be provided through the simplifying the prior-art step of coating the interior of the honeycomb.

34 Claims, 5 Drawing Sheets

U.S. PATENT DOCUMENTS

| | | | | |
|---|---|---|---|---|
| 5,258,150 | A * | 11/1993 | Merkel et al. | 264/43 |
| 5,656,203 | A * | 8/1997 | Mikeska | 252/518.1 |
| 6,468,325 | B1 * | 10/2002 | Cutler et al. | 55/523 |
| 6,638,568 | B1 * | 10/2003 | Baecker et al. | 427/140 |
| 6,811,868 | B2 * | 11/2004 | Hasegawa et al. | 428/325 |
| 6,858,563 | B2 * | 2/2005 | Suzawa et al. | 502/439 |
| 7,129,193 | B2 * | 10/2006 | Ito et al. | 502/300 |
| 7,183,236 | B2 * | 2/2007 | Hase et al. | 502/439 |
| 7,223,716 | B1 * | 5/2007 | Koike et al. | 502/439 |
| 7,358,210 | B2 * | 4/2008 | Tanaka et al. | 502/251 |
| 2002/0039964 | A1 * | 4/2002 | Tanaka et al. | 502/304 |
| 2003/0022788 | A1 * | 1/2003 | Tanaka et al. | 502/325 |
| 2003/0092567 | A1 * | 5/2003 | Tanaka et al. | 502/302 |
| 2003/0092569 | A1 * | 5/2003 | Koike et al. | 502/325 |
| 2003/0171217 | A1 * | 9/2003 | Koike et al. | 502/439 |
| 2003/0224933 | A1 * | 12/2003 | Kondo et al. | 502/439 |
| 2003/0228457 | A1 * | 12/2003 | Hasegawa et al. | 428/307.3 |
| 2004/0092395 | A1 * | 5/2004 | Hase et al. | 502/439 |
| 2006/0178265 | A1 * | 8/2006 | Kita et al. | 502/439 |

FOREIGN PATENT DOCUMENTS

| | | |
|---|---|---|
| JP | 52 105587 | 9/1977 |
| JP | 63 103877 | 5/1988 |
| JP | 2001 310128 | 11/2001 |
| JP | 2002 172329 | 6/2002 |
| JP | 2004 298709 | 10/2004 |

* cited by examiner

NEEDLE-SHAPED CERAMIC BODY, NEEDLE-SHAPED CERAMIC CATALYST BODY AND METHOD FOR PRODUCING SAME

TECHNICAL FIELD

The present invention relates to a needle-shaped ceramic body and a needle-shaped ceramic catalyst body, and more particularly to a needle-shaped ceramic honeycomb catalyst body that can be very suitably used for members that are exposed to high velocity gas flows and high temperatures exceeding 700° C., such as, for example, automotive three-way catalysts for $NO_x$ removal, combustion catalysts for gas turbines and catalysts for purifying high-temperature gases. Within, for example, the art of producing oxide-type honeycomb structures for application as catalyst carriers for automotive three-way catalysts, the present invention, responding to the heretofore strong demand for the development of a high specific surface area porous cordierite body that exhibits both a high specific surface area and a reduced sintering-induced decline in specific surface area even upon long-term exposure to high temperatures, is useful by virtue of providing a needle-shaped ceramic body in which a base material is a porous cordierite body that exhibits a high specific surface area and a reduced sintering-induced decline in specific surface area, even upon long-term exposure to temperatures exceeding 800° C.; a technology for fabricating a novel porous cordierite body that enables the production of, for example, a catalyst carrier honeycomb structure that is directly formed by the aforementioned porous cordierite; and the products afforded by this fabrication technology. The present invention is characterized in particular by the use as catalyst carrier honeycomb structure of a porous cordierite comprising a porous structure in which needle-shaped crystals are three-dimensionally bonded, and, with regard to needle-shaped ceramic bodies in which a porous cordierite body is a base material, is thereby able to realize an inhibition of the sintering-induced decline in specific surface area, direct fabrication of a honeycomb structure as the cordierite sinter itself, omission of the prior-art process in which a coating is executed on the interior of the honeycomb, and an inexpensive method for fabricating the preceding.

BACKGROUND ART

Oxide-type honeycomb structures for application as catalyst carriers have already reached the level of practical utilization with regard to members subjected to long-term exposure to which temperatures, for example, combustion catalysts and automotive three-way catalysts, and developmental efforts targeted to additional improvements in their properties are actively moving forward. Among these oxide-type honeycomb structures, cordierite, by virtue of its high melting point of about 1400° C., its very low coefficient of thermal expansion, and its excellent resistance to thermal shock, is employed for the honeycomb structures that are used as catalyst carriers in high temperature zones where the temperature exceeds 800° C., e.g., for automotive three-way catalysts, combustion catalysts for gas turbines, and catalysts for the purification of high-temperature gases.

While the usefulness of cordierite as a catalyst carrier has already been recognized, it is quite difficult using prior-art methods for producing porous cordierite to fabricate heat-stable porous cordierite that exhibits a high specific surface area, and as a consequence current practice is to coat the inner walls of the cordierite honeycomb with, for example, gamma-alumina, which has a high specific surface area, and to support the catalyst on this coating. However, a problem with gamma-alumina is the difficulty of maintaining its high specific surface area at high temperatures of 1000° C. or above due to the transformation to alpha-alumina and the advance of sintering.

Numerous reports of research on the fabrication of high specific surface area cordierite sinters have appeared to date. However, sintering progresses in the high specific surface area porous cordierites reported to date when they are heated at high temperatures exceeding 1000° C., resulting in a dramatic decline in specific surface area, and the high specific surface area porous cordierites reported to date therefore cannot be used as catalyst carriers for members exposed to high temperatures.

The present inventors have to date succeeded in the development of porous cordierite bodies constituted of needle-shaped cordierite crystals having submicron diameters, and, as described in the references to the prior art have introduced honeycomb structures made of porous cordierite that directly utilize these porous cordierite bodies and honeycomb structures made of porous cordierite that employ the application of a coating on the interior walls of the porous cordierite body (Japanese Patent Application Laid-open Numbers 2003-321280, 2003-212672, 2003-025316, 2002-355511, 2002-119870, 2002-172329, 2001-310128, and Hei 11-171537). And as noted above, in those cases where cordierite is used in a member exposed to high temperatures, at present no method is available other than the application of a coating of, e.g., gamma-alumina, on the interior walls of the honeycomb structure.

Still, there have been problems with the application of a coating on the interior walls of the honeycomb structure, such as a reduction in specific surface area due to debonding of the coating layer and the advance of sintering as well as pressure losses by the gas stream passing through the honeycomb structure, and there has been demand for a solution to these problems. Given the preceding, there has been strong desire in the concerned technical field for the development of a high specific surface area porous cordierite body that exhibits little sintering-induced decline in specific surface area even upon long-term heating at high temperatures but in fact to date such a high temperature-stable, high specific surface area porous cordierite body has not been developed.

DISCLOSURE OF THE INVENTION

In view of the circumstances and the prior art described above, the present inventors carried out extensive and intensive investigations with the goal of developing a novel cordierite honeycomb structure for application as a catalyst carrier, that would be able to decisively solve the problems described above for the prior art. As a result of these investigations the inventors discovered inter alia, that a porous structure can be fabricated which is resistant to sintering at high temperatures and which has a prescribed porosity afforded by the three-dimensional bonding of needle-shaped crystals and that this makes possible a quite substantial increase in the surface area. The inventors also discovered that because the bulk as a whole is constituted of a needle-shaped crystal phase, the advance of sintering is suppressed even during heating at high temperature, thereby making possible a substantial inhibition of sintering-induced diminution of the specific surface area. The inventors further discovered that it is possible to omit, for example, the step in prior-art prediction methods of coating gamma-alumina on the interior walls of the honeycomb structure. The present invention was then achieved after further investigations. An object of the present invention is to provide a needle-shaped ceramic body and honeycomb structure thereof, in which a base material is a novel porous cordierite body that has a high specific surface area and that can resist a decline in specific surface area even upon heating at 1000° C. or above. An additional object of the present invention is to provide methods of producing this needle-shaped ceramic body and honeycomb structure and to provide a needle-shaped ceramic catalyst body as an article of manufacture therefrom.

In order to solve the problems cited above, the present invention comprises a ceramic body characterized in that at least a portion of the ceramic particles therein contains at least Si, Al, and Mg and has a needle-shaped morphology. The present invention further comprises a ceramic body characterized in that ceramic particles that contain at least Si, Al, and Mg and that have a needle-shaped morphology are coated on at least a portion of the surface of the ceramic body. The present invention further comprises a ceramic body in which at least a portion of the ceramic particles therein contains at least Si, Al, and Mg and has a needle-shaped morphology, characterized in that the surfaces of the aforementioned ceramic particles have pores and/or an element capable of directly supporting a catalyst component. The invention further comprises a ceramic body in which ceramic particles that contain at least Si, Al, and Mg and that have a needle-shaped morphology are coated on at least a portion of the surface of the ceramic body, characterized in that the surfaces of the aforementioned ceramic particles have pores and/or an element capable of directly supporting a catalyst component. The present invention further comprises a ceramic catalyst body characterized in that a catalyst component is supported on a ceramic body as described above. The present invention further comprises a ceramic catalyst body characterized in that the aforementioned ceramic body and/or the aforementioned ceramic catalyst body contains a co-catalyst component. The present invention further comprises a method of producing a ceramic body that has needle-shaped particles characterized by producing a ceramic body in which a portion of the ceramic particles therein contain at least Si, Al, and Mg and have a needle-shaped morphology, using a starting material comprising a compound of $SiO_2$ and $Al_2O_3$ as an Si source. The invention further comprises a method of producing a ceramic catalyst body characterized by supporting a catalyst component on a ceramic body as described above. The invention further comprises a method for producing a ceramic catalyst body characterized by supporting a co-catalyst component on a ceramic body as described above and/or a ceramic catalyst body as described above.

The present invention is described in greater detail hereinbelow.

By making it possible to support the required amount of catalyst component on the ceramic carrier itself and thereby dispensing with the necessity for the application of a gamma-alumina coating in order to increase the specific surface area, the present invention characteristically provides a ceramic carrier and a ceramic catalyst body that exhibit a reduced heat capacity, a reduced pressure loss, and a reduced thermal expansion coefficient, and also characteristically provides methods of producing this ceramic carrier and ceramic catalyst body. The ceramic body according to the present invention essentially has a base material of a porous cordierite bulk having a structure in which a needle-shaped crystal phase is three-dimensionally intertwined, and is constituted of a porous cordierite body comprising, by means of a three-dimensional bonding of the needle-shaped crystals, a porous structure of prescribed porosity that has both an increased and a high specific surface area.

The needle-shaped ceramic body according to the present invention will be described first. A starting powder blended so as to provide the cordierite composition is used as the starting material for the present invention. For example, high-purity kaolin, talc, alumina, and silica powders may be weighed out so as to provide the cordierite composition and blended to give the starting material. In order to reduce the temperature of cordierite production, for example, not more than 3 weight % boron oxide ($B_2O_3$) or cerium oxide ($CeO_2$) can be added to the starting powder. Moreover in order to induce the growth of whiskers, for example, no more than 2 weight % of an alkali metal oxide, e.g., strontium oxide ($SrO_2$), or no more than 5 weight % of a rare-earth oxide can be added to the starting powder. In order to raise the post-sintering porosity of the sinter, for example, 10 to 30 weight % carbon black can also be added. This makes it possible to obtain, for example, a sinter with a porosity of 38 to 55%.

In the present invention a mixed slurry is prepared by mixing a mixed powder of the aforementioned starting powder and additives using, for example, a ball mill; the mixed slurry is dried using, for example, an evaporator or oven; he resulting dried material is ground and classified; and the resulting powder is compression molded and then sintered in the atmosphere at 1200 to 1400° C. A cordierite bulk containing submicron needle-shaped cordierite crystals can be fabricated in this manner.

The present inventors have previously developed a porous cordierite body composed of submicron-level needle-shaped crystals and fabricated by the method described above. It was determined that this porous body does not undergo a decline in specific surface area even when subjected to high temperatures because it does not have the structure seen in typical polycrystalline bodies in which the crystalline phase is fused through an intergranular phase. However, the application of this porous cordierite body as a catalyst carrier required an additional increase on its specific surface area.

The technology of inducing porosity by treating a cordierite sinter with acid is already known, and the specific surface area of a cordierite sinter can be dramatically improved by treatment with a strong acid. However, because the silica phase at the surface of the crystal gains is porosified in the high specific surface area porous cordierite bodies that have been generally reported, these high specific surface area porous cordierite bodies have suffered from the problem of a substantial decline in specific surface area at high temperatures, for example, at or above 1000° C., due to the advance of sintering. The present inventors, by using kaolin as a starting material for the previously developed porous cordierite body, were able to induce the deposition of a needle-shaped cordierite crystal phase, and, by treatment of this with weak acid, were able to produce a high-strength porous cordierite body composed of a needle-shaped crystal phase with a submicron-level diameter.

As a result of various investigations in pursuit of the development of a method that would enable the specific surface area of the aforementioned porous cordierite body to be increased further while retaining the strength thereof, the present inventors discovered that a needle-shaped cordierite crystal phase is formed when this porous cordierite body is treated with a weak acid having a low degree of dissociation, e.g., acids that contain a carboxyl group (—COOH), phosphoric acid, hydrogen sulfide, and so forth. It was also found that, in the case of treatment with a weak acid, control of the size and number of the nanoscale needle-shaped crystal phases that are deposited, i.e., the specific surface area, can be achieved by varying the treatment time and the concentration of the weak acid. The weak acid used by the present invention can be exemplified by carboxylic acids such as oxalic acid, acetic acid, and formic acid, but is not limited to these, and weak acids equivalent or similar to the preceding can be similarly used.

Specifically, the porous body as a whole is constituted of a needle-shaped crystal phase in the case of the needle-shaped ceramic body according to the present invention in which a base material is a high specific surface area porous cordierite body that is stable at high temperatures, and, for example, treatment with a weak acid is necessary in order to produce this porous body. Furthermore, the structure, porosity, and specific surface area of the porous cordierite body can be freely varied by adjusting the type of acid, concentration of the acid, and/or treatment time.

In relation to the type of acid, concentration of the acid, and/or treatment time in the practical realization of the present invention, and considering the time periods that are substantially practical suitable treatment conditions that provide a maximum specific surface area can be established in the acid concentration range of 0.001 to 2 normal for all of the weak acids cited above.

The mechanism by which porosity is induced in cordierite by the acid treatment is unclear at the present time; however, it has been found that components of the cordierite phase are eluted from the surface by the acid treatment. Although treatment with highly dissociated acids, i.e., strong acids, does result in the elution of large amounts of constituent components and porosification, it was found that elution cannot be regulated in this case due to the high elution rate and that the surface of the crystal phase is immediately made smooth and the specific surface area therefore does not undergo an increase.

The elution mechanism in the case of treatment with acid with a low degree of dissociation, i.e., a weak acid, is thought to be the same as for strong acids; however, treatment with a weak acid makes it possible to moderate the elution rate in turn making it possible to stop the treatment at a stage in which a micro-fine needle-shaped crystal phase, which is formed in the early phase of elution, is deposited. In other words, it becomes easy to stop the treatment at a time point that provides a favorable specific surface area, making possible the production of a high specific surface area porous cordierite body.

When a weak acid is used, treatment with a weakly concentrated solution also makes it even easier to control the treatment to the aforementioned stage that provides a favorable specific surface area. When the acid treatment is to be stopped in the stage that provides a favorable specific surface area, longer treatment times are required when a less concentrated acid is used, while shorter treatment times are required when the concentration is higher. In other words, treatment conditions that provide a favorable specific surface area can be adjusted using the concentration of the weak acid and the treatment time.

Since the degree of dissociation of the acid varies as a function of the type of acid, the treatment conditions associated with the favorably high specific surface area in the method for producing a high specific surface area porous cordierite body according to the present invention can be adjusted as appropriate using the type of acid, acid concentration, and/or treatment time. This treatment with weak acid in the present invention denotes an acid treatment that enables the treatment to be stopped at a stage in which a microfine needle-shaped crystal phase, which is formed in the early phase of elution, is deposited, and that thereby enables three-dimensional bonding of needle-shaped crystals. The present invention encompasses all acid treatments that enable such a treatment to be carried out. The high temperature-stable, high specific surface area porous cordierite body according to the present invention characteristically has a high specific surface area of at least 1 $m^2/g$ and characteristically resists sintering-induced diminution of the specific surface area at high temperatures of 1000° C. or above.

A method known for the fabrication of high specific surface area porous cordierite bodies involves the formation of a silica layer on a polycrystalline cordierite body and porosification of this silica layer. However, the high specific surface area porous cordierite bodies reported to date are polycrystalline bodies having an interposed grain boundary layer and, for example, are known to exhibit a substantial decline in specific surface area due to the advance of sintering upon heating at 1050°C.

In a preferred embodiment of the present invention, pores and/or an element capable of directly supporting a catalyst component are present at the surface of the aforementioned ceramic particles in the aforementioned needle-shaped ceramic body. More specifically a ceramic carrier is favorably used in the present invention that has pores in its ceramic body surface with a diameter or width no more than 1000 times and preferably from 1 to 1000 times the diameter of the catalyst component ion to be supported wherein the number of these pores is at least $1\times10^{11}$ per L, preferably at least $1\times10^{16}$ per L, and more preferably at least $1\times10^{17}$ per L. These pores are specifically formed by defects such as a lattice defect or an oxygen defect in the ceramic crystals by microcracks formed in the ceramic surface, and by deficiencies in the elements constituting the ceramic. It will be sufficient for at least one type of these pores to be formed in the ceramic carrier, but a plurality of types may also be formed in combination in the ceramic carrier.

For example a cordierite honeycomb structure that has a honeycomb-shaped carrier shape and that contains cordierite, whose theoretical composition is represented by $2MgO\cdot2Al_2O_3\cdot5SiO_2$, as its main component is suitably used as the ceramic body in the present invention. Since the diameter of catalyst component ions is generally about 0.1 nm, the diameter or width of the pores formed in the surface of the cordierite honeycomb structure is preferably 0.1 to 100 nm in correspondence to 1 to 1000 times the catalyst component ion diameter, while the pore depth is preferably at least ½ the diameter of the catalyst component ion, i.e., at least 0.05 nm. The presence of at least the pore number specified above makes it possible for the ceramic carrier to directly support the catalyst component while retaining the required strength.

In those cases where the ceramic body has pores consisting of oxygen defects and/or lattice defects, the pore number is largely related to the amount of oxygen in the cordierite honeycomb structure, and the mount of oxygen in the cordierite honeycomb structure is brought to less than 47 weight % or more than 48 weight % in order to give at least the pore number specified above. In addition, among the crystal axes of the cordierite crystal, the lattice constant of the $b_0$ axis should be made greater than 16.99 or less than 16.99. In specific terms, a pore number in the ceramic carrier of at least $1\times10^{16}$ per L and preferably at least $1\times10^{17}$ per L is achieved when the cordierite honeycomb structure contains at least $4\times10^{-6}$% and preferably at least $4\times10^{-5}$% cordierite crystals that have at least one oxygen defect and/or lattice defect in the unit crystal lattice or contains at least $4\times10^{-8}$ and preferably at least $4\times10^{-7}$ oxygen and/or lattice defects per cordierite unit crystal lattice.

When a catalyst component is to be supported, in general the catalyst component ion is dissolved in a solvent and the catalyst is supported by immersing the ceramic carrier in the resulting solution. In the case of prior-art gamma-alumina-coated cordierite honeycomb structures, the pore diameter of the catalyst component-supporting gamma-alumina is generally about 2 nm, while catalyst metal particles are, at about 5 nm, generally larger than the pore diameter of the gamma-alumina. Based on this it is thought that the pores of gamma-alumina are required in order to retain catalyst component ions during the catalyst support process rather than for retaining catalyst metal particles. The ion of the catalyst component can be retained when the pore has a diameter or width at least equal to the diameter of the catalyst component ion, that is, when the pore has a diameter or widths of at least 0.1 nm. However, in order to secure strength for the honeycomb structure, the pore diameter or width must be no more than about 1000 times the diameter of the catalyst component ion, or no more than 100 nm for a diameter of 0.1 nm. With regard to pore depth the catalyst component ion can be supported when the pore depth is at least ½ the diameter of the catalyst component ion that is to be supported.

Pores formed from a defect or crack are extremely small and the corresponding specific surface area cannot be measured by ordinary methods, and for this reason it is the pore number required for supporting a prescribed quantity of catalyst component that is specified in the present invention. Approximately 1.5 g catalyst metal per 1 liter of honeycomb structure volume is supported in the three-way catalysts in current use. In order or the catalyst metal to exhibit its exhaust gas purification function, the diameter of the catalyst metal particles must be smaller than about 1000 nm and preferably smaller than about 20 nm.

Assuming that platinum is being supported at 1.5 g/L just as for the three-way catalysts in current use, then the number of platinum particles supported will be $1.34 \times 10^{11}$ per L if all the platinum particles have a diameter of 1000 nm and will be $1.67 \times 10^{16}$ per L if all the platinum particles have a diameter of 20 nm. Since approximately 1 pore is required per catalyst metal particle in order to support the catalyst metal, the pore number required to directly support the catalyst metal particles is a least $1 \times 10^{16}$ per L or more and preferably $1 \times 10^{16}$ per L or more. The purification function is equal to that of three-way catalysts when the average diameter of the catalyst metal particles is about 10 nm on the whole. At this point the number of catalyst metal particles is $1.34 \times 10^{17}$ per L and the required number of pores is more preferably at least $1 \times 10^{17}$ per L.

On the other hand, a cordierite honeycomb structure with a cell wall thickness of 100 μm and a cell density of 400 cpsi (cells per square inch) weighs approximately 230 g per 1 liter of volume. With regard to the number of cordierite crystals, assuming that this is contributed entirely by cordierite ($Mg_2Al_4Si_{15}O_{18}$) and assuming $1 \times 10^{16}$ oxygen or lattice defects per L of the cordierite honeycomb structure and assuming that each crystal has only a single defect, then the percentage of crystals having a defect in the total number of cordierite crystals is $4 \times 10^{-5}$ for $1 \times 10^{17}$ defects.

With regard to the number of defect per cordierite crystal, the number of defects per unit crystal lattice becomes $4 \times 10^{-8}$ for $1 \times 10^{16}$ defects per L and $4 \times 10^{-7}$ for $1 \times 10^{17}$ defects per L.

Pore formation for the purpose of endowing the cordierite honeycomb structure with the ability to support a catalyst is carried out in this invention by the following methods: (1) formation of oxygen defects and/or lattice defects (metal vacancies, lattice strain) in the cordierite crystal lattice; (2) formation of large numbers of microcracks in the amorphous phase and/or crystalline phase; (3) formation of deficiencies by eluting impurities and/or cordierite constituent elements using a liquid-phase procedure; (4) chemical or physical formation of deficiencies by a gas-phase procedure; and (5) introduction of a substance that has an oxygen storage capacity. By the formation of these pores in at least the numbers prescribed above, it is possible in the present invention to dispense with gamma-alumina coating and to directly support the catalyst component. In addition, since the pores formed by these methods do not destroy the ceramic crystal lattice as in the prior art, even with thin cell walls it becomes possible to provide a crush strength in the flow channel direction of at least 10 MPa and a coefficient of thermal expansion of no more than $1 \times 10^{-6}/°C$.

Cordierite honeycomb structures endowed with a catalyst-supporting capacity by these methods will now be described. The description will turn first to cordierite honeycomb structures that have oxygen defects and lattice defects (metal vacancies and lattice strain) in the cordierite crystal lattice as cited above in (1). Defects that enable catalyst component to be supported include oxygen defects and lattice defects. Oxygen defects are defects that are formed by a deficit of oxygen for formation of the cordierite crystal lattice and enable catalyst component to be supported in the pores formed by the omission of oxygen. The oxygen content in the honeycomb structure is preferably brought to less than 47 weight % in order to make it possible to support the required amount of catalyst component.

The lattice defects are lattice defects formed by the incorporation of oxygen in excess of the amount required for the formation of the cordierite crystal lattice and enable catalyst component to be supported in the pores formed by strain of the crystal lattice and or by metal vacancies. Specifically the oxygen content in the honeycomb structure is preferably brought to more than 48 weight %.

A cordierite honeycomb structure having crystal lattice defects can be produced by manipulating the firing atmosphere for the honeycomb structure or by using special starting materials. Oxygen defects can be generated by the following methods: 1) using a reduced-pressure atmosphere or a reducing atmosphere for the firing atmosphere 2) using an oxygen-free compound for at least a portion of the starting material that will be converted to cordierite and carrying out firing in atmosphere that has a low oxygen concentration; and 3) replacing a portion of at least one constituent element of cordierite, other than oxygen, with an element having a lower valence than the replaced element. In addition, lattice defects can be generated by 4) replacing a portion of a constituent element of cordierite, other than oxygen, with an element having a higher valence than the replaced element.

These generation methods will now be described. First, when the production of a cordierite honeycomb structure having oxygen defects is pursued through method 1) cited above, the starting materials in this case can be the materials generally used as starting materials for conversion to cordierite, for example, talc ($Mg_3Si_4O_{10}(OH)_2$), kaolin ($Al_2Si_2O_5(OH)_4$), calcined kaolin, alumina ($Al_2O_3$), aluminum hydroxide ($Al(OH)_3$), and so forth. In addition to these compounds, oxides, hydroxides, and so forth that contain at least one selection from the Si, Al, and Mg constituent elements of cordierite can also be used as an Si source, Al source, or Mg source.

These starting materials for conversion to cordierite are compounded so as to provide the theoretical composition cited above and, after the addition of water and molding auxiliaries such as binder, lubricant, and humectant, are kneaded and molded into a honeycomb shape by extrusion molding. This molding is then heated to at least about 500° C. in the atmosphere to effect decarbonization followed by fitting in a reduced-pressure atmosphere or reducing atmosphere to give the honeycomb structure. In the case of firing in a reduced-pressure atmosphere, a vacuum of about 4000 Pa (30 torr) or below is preferred with firing being carried out generally by holding for at least 2 hours at about 1350° C. or above.

By firing in a reduced-pressure atmosphere, oxygen present in the starting materials becomes a gas during the reaction processes during firing and leaves, causing a deficit of oxygen available for formation of the cordierite crystals and leading to the formation of oxygen defects in the cordierite crystal lattice. Firing in a reducing atmosphere is the same: when firing is carried out under the same conditions as above in a reducing atmosphere of, for example, hydrogen, oxygen present in the starting materials reacts with the reducing gas during the reaction processes during firing and is thereby removed. This again results in a deficit of oxygen available for formation of the cordierite crystals and leads to the formation of oxygen defects in the cordierite crystal lattice. When only oxides are used as the starting materials for conversion to cordierite, the oxygen present in the starting materials can by itself supply the oxygen for cordierite crystal formation and in consequence thereof it is necessary to remove oxygen using a reduced-pressure atmosphere or a reducing atmosphere.

When the production of a cordierite honeycomb structure having oxygen defects is pursued through method 2) cited above, an oxygen-free compound containing at least one selection from Si, Al, and Mg is used for at least a portion of the Si source, Al source, and/or Mg source making up the starting material for conversion to cordierite. Such a compound can be exemplified by nitrides and halides, e.g., fluorides and chlorides, that contain at least one selection from the cordierite constituent elements Si, Al, and Mg. The subject oxygen-free compound should be made all or part of at least one selection from the Si source, Al source, and Mg source. The other starting materials for conversion to cordierite can be the same as those in the previously described method 1).

These starting materials for conversion to cordierite are compounded so as to provide the theoretical composition cited above and are molded into a honeycomb shape as described for method 1). This is followed by decarbonization and then firing in an atmosphere that contains a low oxygen concentration. The oxygen concentration in this atmosphere is at least 0% but less than 3% and preferably is at least 0% but no greater than 1%, and by means of this oxygen defects are formed in the cordierite crystal lattice. When an oxygen-free compound is used as a starting material for conversion into cordierite, the oxygen present in the starting materials by itself is insufficient for formation of the cordierite crystals. While the oxygen deficiency could be made up from the firing atmosphere the quantity of oxygen required for formation of the cordierite crystals is not fully supplied during the reaction processes due to the low oxygen concentration in the firing atmosphere, resulting in the formation of oxygen defects in the cordierite crystal lattice.

When an oxygen-free compound is used as a starting material for conversion to cordierite in the manner described above, firing can also be carried out in a reduced-pressure atmosphere or in a reducing atmosphere as in method 1) in place of firing in an atmosphere with a low oxygen concentration. In these cases again, oxygen defects are formed in the cordierite crystal lattice because the quantity of oxygen required for formation of the cordierite crystals is not fully supplied during the reaction processes.

Method 3) cited above forms oxygen defects by replacing at least a portion of the Si, Al and/or Mg cordierite constituent elements with an element having a lower valence than the replaced element. When a cordierite honeycomb structure is produced by this method, a starting material for conversion to cordierite is used in which a portion of the Si source, Al source, and/or Mg source is replaced by a compound that contains, in place of the Si, Al, and/or Mg cordierite constituent elements, an element with a valence lower than the replaced elements. The valences of the cordierite constituent elements are Si(4+), Al(3+), and Mg(2+) and a portion of at least one selection from thereamong should be made a compound that contains an element with a valence lower than the replaced element. Oxides, hydroxides, nitrides, halides, and so forth can be used as these compounds. With regard to the Si, Al, and Mg sources other than this, the starting material for conversion into cordierite is prepared using the usual starting materials. This starting material for cordierite production is molded into a honeycomb by the same method and is then decarbonized and fired. The firing atmosphere can be an oxygen-free atmosphere or can be an oxygenated atmosphere such as a reduced-pressure atmosphere, a reducing atmosphere, an air atmosphere, and so forth. Since the oxygen required for cordierite formation is present in the starting material and since the oxygen defects are due to element substitution, the oxygen concentration has no influence and oxygen defects are formed in the oxygen concentration range from 0 to 100%.

The cordierite constituent elements have positive charges of Si(4+), Al(3+), and Mg(2+). When these are replaced with a lower valent element, there is a deficiency in the positive charge in correspondence to the amount of substitution and the difference in valence with the replaced element, and negatively charge O(2−) is expelled in order for the crystal lattice to maintain electrical neutrality. Oxygen defects are then again formed in the cordierite crystal lattice by this substitution of a cordierite constituent element by a lower valent element.

In method 4) cited above, lattice defects are formed by replacing at least a portion of the Si, Al, and/or Mg cordierite constituent elements with an element with a higher valence than the replaced element. When a cordierite honeycomb structure is produced by this method, a starting material for conversion to cordierite is used in which a portion of the Si source, Al source, and/or Mg source is replaced by a compound that contains, in place of the Si, Al, and/or Mg cordierite constituent elements, an element with a valence higher than the replaced elements. In this case also, or at least one selection from Si, Al, and Mg a portion thereof is made a compound that contains an element with a valence higher than the replaced element. With regard to the Si, Al, and Mg sources other than this the starting material for conversion into cordierite is prepared using the usual starting materials. This starting material for cordierite production is molded into a honeycomb by the same method and is then decarbonized and fired. The firing atmosphere in method 4) must be an atmosphere that can supply an adequate amount of oxygen such as an air atmosphere. Since decarbonization can be carried out during firing when the firing atmosphere is an air atmosphere, the decarbonization step can also be omitted.

When, conversely a cordierite constituent element is replaced by a higher-valent element, positive charge is present in excess in correspondence to the degree of substitution and the difference in valence with the replaced element and negatively charged O(2−) is incorporated in the amount necessary for the crystal lattice to maintain electrical neutrality. The incorporated oxygen acts as a hindrance and the cordierite crystal lattice becomes unable to align in an orderly manner, thus forming lattice defects.

When oxygen defects are formed in the cordierite crystal lattice, the amount of oxygen contained in the cordierite unit crystal lattice will be less than that in a unit crystal lattice lacking oxygen defects. In addition, since the crystal lattice undergoes deformation as regions missing oxygen collapse, the lattice constant of the $b_0$ axis of the cordierite crystal axes become smaller. When, on the other hand, lattice defects are formed in the cordierite unit crystal lattice, the amount of oxygen contained in the cordierite unit crystal lattice becomes larger than that in a unit crystal lattice lacking lattice defects and the lattice constant of the $b_0$ axis changes. More specifically, when the amount of oxygen in the honeycomb structure falls below 47 weight % due to the formation of oxygen defects, the number of oxygens in the cordierite unit crystal lattice falls below 17.2 and the lattice constant of the $b_0$ cordierite crystal axis falls below 16.99. In addition, when the amount of oxygen in the honeycomb structure exceeds 48 weight % due to the formation of lattice defects, the number of oxygen in the cordierite unit crystal lattice becomes larger than 17.6 and the lattice constant of the $b_0$ crystal axis becomes larger or smaller than 16.99.

As described above, the present invention makes it possible, by means of oxygen or lattice defects formed in the cordierite crystal lattice, to support catalyst component in the required amounts on a cordierite honeycomb structure. Since it is thought that the size of these defects is no more than several angstroms, it cannot be measured as the specific surface area with the usual methods for measuring the specific surface area, such as the BET procedure using the nitrogen molecule.

The cordierite honeycomb structure containing large numbers of microcracks in the amorphous phase and/or crystalline phase, as cited in (2) above, will now be described. These microcracks are microcracks formed in the amorphous phase or crystalline phase by 1) the application of thermal shock to the cordierite honeycomb structure or 2) the application of shock waves to the cordierite honeycomb structure, and the catalyst component can be supported in the large number of cores formed in this manner. In order to support a catalyst component, the crack width must be at least about equal to the diameter of the catalyst component ion and generally is at least 0.1 nm, while the depth must be at least ½ of the diameter of the catalyst component ion and generally is at least 0.05 nm. In order to secure strength for the honeycomb structure, the cracks are preferably small and generally have a width no greater than about 100 nm and preferably have a width of about 10 nm or less.

With regard to the method of applying thermal shock as cited in 1) above, a procedure is used in which the cordierite honeycomb structure is heated and then rapidly cooled. The application of thermal shock should be carried out after the formation of cordierite crystalline and amorphous phases in the cordierite honeycomb structure, and a method can be used in which the cordierite honeycomb structure, already obtained by the usual methods by molding a starting material for cordierite production containing Si, Al, and Mg sources and then decarbonization and thereafter firing is reheated to a prescribed temperature and thereafter rapidly cooled, or a method can be used in which rapid cooling is carried out from a prescribed temperature during the firing and cooling step. In order to induce crack formation by thermal shock, in general the difference between the heating temperature and the post-quench temperature (the thermal shock temperature difference) should be at least about 80° C., and crack size will increase as the size of the thermal shock temperature difference increases. However, as it becomes problematic to maintain the honeycomb structure shape when the cracks grow too large, the thermal shock temperature difference is preferably generally held to no more than about 900° C.

The amorphous phase is present in the cordierite honeycomb structure in the form of a layer around the crystalline phase. Due to the difference in the coefficient of thermal expansion between the amorphous and crystalline phases, when thermal shock is applied by quenching the heated cordierite honeycomb structure, thermal stress corresponding to this difference in coefficients of thermal expansion and the thermal shock temperature difference acts in the vicinity of the interface between the amorphous and crystalline phases. Microcracks are generated when the amorphous phase or crystalline phase is unable to withstand this thermal stress. The amount of microcrack production can be controlled through the amount of amorphous phase present in the cordierite honeycomb structure. Since the microcracks are formed in the vicinity of the boundary between the amorphous and crystalline phases, a more abundant amorphous phase is accompanied by a more abundant formation of microcracks.

With regard to the amorphous phase present in the cordierite honeycomb structure, it is thought that alkali metal and alkaline-earth metal elements present in trace amounts in the cordierite starting material act as a flux during honeycomb firing and form this amorphous phase. As a consequence, the amount of amorphous phase can be increased by the addition of an alkali metal element or alkaline-earth metal element, which results in an increase in the amount of microcrack production upon the application of thermal shock. In addition, the amount of microcrack production can be controlled through the quantity of addition of the alkali metal element or alkaline-earth metal element at this point. To obtain an effect from the addition, an amount equal to or greater than the content of the alkali metal element and/or alkaline-earth metal element as impurities in the starting material is desirably present, and in general the sum of the alkali metal element and alkaline-earth metal element contained in the cordierite honeycomb structure is desirably at least 0.05 weight %. The alkali metal element and alkaline-earth metal element can be added during production of the starting material for conversion to cordierite, in the form of a compound that contains alkali metal element and/or alkaline-earth metal element, for example, as the oxide, hydroxides or carbonate salt.

Microcracks can also he formed in the amorphous or crystalline phase by the application of shock waves, as cited in 2) above, rather than thermal shock. In this case, microcracks are formed when low-strength regions within the honeycomb structure unable to withstand the energy of the shock waves. The method for applying the shock waves can be exemplified by ultrasound vibration, and so forth, and the amount of microcrack production can be controlled by, for example, the energy of the shock waves.

A large number of microcracks can also be additionally formed in the amorphous phase or crystalline phase as cited in (2) of a honeycomb structure in which oxygen defects and/or lattice defects have been formed in the cordierite crystal lattice as cited in (1) above. In this case, a cordierite honeycomb structure containing numerous microcracks and oxygen defects and/or lattice defects can be obtained by the application of thermal shock or shock waves in method (2) after the firing of a honeycomb structure that contains oxygen defects and/or lattice defects in accordance with the above-mentioned method (1) wherein the oxygen content is less than 47 weight % or more than 48 weight % and the lattice constant of the crystal axis $b_0$ is larger or smaller than 16.99. In order to support the required amount of catalyst component the sum of the microcracks and oxygen defects and/or lattice defects should be brought to at least $1\times10^7$ per liter and preferably at least $1\times10^8$ per liter. Microcracks can also be formed in the amorphous phase or crystalline phase by the shock wave application method (2).

A description will now be given of a cordierite honeycomb structure in which a deficiency has been formed by the elution of impurities and/or cordierite constituent elements by the liquid-phase method (3) cited above. This deficiency is formed by the elution, into high-temperature, high-pressure water, a supercritical fluid, or a solution such as a base solution of the metal elements in the cordierite crystals, Mg, Al, the alkali metal and/or alkaline-earth metal elements present in the amorphous phase, or the amorphous phase itself. Catalyst component can be supported in the pores formed by the deficiency of, for example, these elements.

A cordierite honeycomb structure is obtained, using the usual methods, by molding a cordierite precursor starting material containing an Si source, Al, source, and Mg source followed by decarbonization and then firing in the atmosphere, and this cordierite honeycomb structure is a immersed in high-temperature, high-pressure water, a supercritical fluid or a base solution. This results in pore formation through the elution of the metal elements in the cordierite crystals, i.e., Mg, Al, the alkali metal and/or alkaline-earth metal elements present in the amorphous phase, or the amorphous phase itself. The size of the pores can be controlled through inter alia, the solution temperature pressure, and solvent, and in specific terms high-temperature, high pressure water at 300° C./10 MPa, a supercritical fluid such as $CO_2$ or a base solution such as a sodium hydroxide solution is used. In addition, since, as noted above, the amorphous phase that is formed can be adjusted through the addition of alkali metal and/or alkaline-earth metal elements to the cordierite precursor starting material pore control is also possible through adjustments in this quantity of addition.

A cordierite honeycomb structure in which deficiencies have been chemically or physically formed by a gas-phase procedure as cited in (4) above will now be described. Here, pores are formed by the dry etching or sputter etching of a cordierite honeycomb structure. In the case of dry etching, a reaction gas is raised to an excited state by inducing a discharge in the reaction gas by, for example, high-frequency waves. A volatile substance is formed when the reaction gas reacts with the Si, Al, and/or Mg cordierite constituent elements, and the cordierite is etched by the volatilization of this substance and its exhaust. The region lost by the chemical etching of the cordierite forms a pore making it possible to support a catalyst. $CF_4$, for example is used as the reaction gas, and a volatile substance such as $SiF_4$ is formed by its reaction with the cordierite structure elements. The degree of dry etching can be controlled by, or example the etching time, type of reaction gas, and energy input.

In the case of sputter etching the cordierite honeycomb structure is placed in a plasma of, for example, Ar excited by, for example, high-frequency waves and Ar ions impact on the surface of the cordierite ejecting single atoms or clusters of several atoms of the cordierite constituent elements and thereby etching the cordierite. The region lost by the physical etching of the cordierite forms a pore, making it possible to support a catalyst. The degree of sputter etching can be controlled by for example, the etching time, type of excited gas, and energy input.

A cordierite honeycomb structure that contains a substance having an oxygen storage capacity as cited in (5) above will now be described. Substances that have an oxygen storage capacity, for example, $CeO_2$ incorporate and release oxygen accompanying changes in the ambient oxygen concentration. When the ambient oxygen concentration is high Ce has a valence of 4+, but has a valence of 3+ when the oxygen concentration is low. Since electrical neutrality is disturbed by this change in valence, electrical neutrality is maintained by the release and absorption of oxygen. Substances having such an oxygen storage capacity have heretofore been used as co-catalysts in three-way catalysts and release or incorporate oxygen in response to changes in the oxygen concentration in the exhaust gas, thereby functioning to regulate the air-fuel ratio to near the theoretical air-fuel ratio.

When Ce, which can assume several different valences, is introduced into a cordierite honeycomb structure an a form in which it is substituted for a cordierite constituent element, as in the case of (1), supra, an excess or deficit of oxygen is produced in order to compensate for the change in valence and oxygen or lattice defects are thereby formed in the cordierite crystal lattice. These oxygen and lattice defects form pores, enabling catalyst to be supported while at the same time the cordierite honeycomb structure can be endowed with an oxygen storage capacity. In other words, catalyst can be directly supported without a gamma-alumina coating and an oxygen storage capacity can be developed without having to separately support co-catalyst having an oxygen storage capacity in order to generate an oxygen storage capacity, the $CeO_2$ content in the cordierite honeycomb structure is desirably brought to at least 0.01 weight %.

In order to obtain a $CeO_2$-containing cordierite honeycomb structure, Ce is substituted for a portion of at least one selection from the Si, Al and Mg cordierite constituent elements. Just as in (1) cited above, the substitution method can comprise the use of a cordierite precursor material in which a portion of the Si, Al, and/or Mg sources has been replaced by a compound that contains Ce in place of Si, Al, and/or Mg. In an air atmosphere the valence of Ce is generally 4+, and its substitution for lower valent Mg(2+) and/or Al(3+) naturally leads to the formation of lattice defects as in 4) of (1), supra. Even when substituted for Si(4+), the fact that a portion of the Ce will have a valence of 3+ leads to the formation of oxygen defect-based pores.

The use of Ce as a substitutional element thus enables the preparation of a cordierite honeycomb structure that has a catalyst carrying capacity and an oxygen storage capacity. When $CeO_2$ is supported on a carrier as a co-catalyst, there is a risk that the $CeO_2$ will undergo particle growth due to thermal deterioration, resulting in a decline in the oxygen storage capacity. However, when $CeO_2$ is present in the cordierite structures particle growth does not occur and the decline in oxygen storage capacity is therefore also absent. In addition, microcracks may be produced by the application of thermal shock or shock waves, as cited in (2) above, after the cordierite honeycomb structure has been fired. This increases the number of pores that are formed and can raise the catalyst carrying capacity. Or, through a combination with the method cited in (1) above, the number of oxygen defects or lattice defects that are formed can also be adjusted by using a replacement element in addition to Ce and/or by adjusting the firing atmosphere.

Furthermore, a cordierite honeycomb structure endowed with a catalyst carrying capacity by methods (1) to (4) cited above can also be endowed with an oxygen storage capacity by supporting thereon a co-catalyst that has an oxygen storage capacity such as $CeO_2$. In this case, a cordierite honeycomb structure that has an oxygen storage capacity in addition to a catalyst carrying capacity can be easily prepared since the co-catalyst can be supported, without the application of a gamma-alumina coating, by utilizing the pores present in the cordierite honeycomb structure. A co-catalyst having an oxygen storage function can be supported, when such is to be done, by supporting a precursor for the co-catalyst, such as an ion or complex, followed by a heat treatment.

In addition, by substituting at least one of the elements constituting the ceramic base material with an element other than the constituent element, the ceramic body according to the present invention can be made capable of directly supporting a catalyst component via this substitutional element. The ceramic catalyst body obtained by directly supporting a catalyst component is very suitable for use as, for example, an exhaust gas purification catalyst for automotive applications. Ceramic that contains cordierite, represented by the theoretical composition $2MgO \cdot 2Al_2O_3 \cdot 5SiO_2$, as a component is very suitably used for the ceramic base material. Specifically, a ceramic body is very suitably used that contains at least 1 volume % and preferably at least 5 volume % cordierite. The form of the ceramic body is not particularly limited and various forms can be used, for example, honeycomb, foam, hollow fiber, fiber, particulates, and pellets.

Usable as the element that substitutes for the constituent element (Si, Al, Mg) of the ceramic base material are elements that have a higher bonding strength with the supported catalyst component than these constituent elements and that are capable of supporting a catalyst component by chemical bonding. A specific example or such a substitutional element is at least one element that is different from the aforementioned constituent elements and that has d or f orbitals in its electron orbitals; preferred for use are elements that have a vacant orbital in their d or f orbitals or elements that have two or more oxidation states. Elements that have a vacant orbital in their d or f orbitals have an energy level near that, inter alia, of the noble metal catalysts that will be supported, and readily bond with catalyst components due to facile electron transfer. Elements that have at least two oxidation states also readily engage in electron transfer and have the same activity.

Substitutional elements that have a vacant orbital in their d or f orbitals are specifically exemplified by Sc, Ti, V, Cr, Mn, Fe, Co, Ni, Y, Zr, Nb, Mo, Tc, Ru, Rh, La, Ce, Pr, Nd, Pm, Sm, Eu, Gd, Tb, Dy, Ho, Er, Tm, Lu, Hf, Ta, W, Re, Os, Ir, and Pt, wherein at least one element selected from Ti, V, Cr, Mn, Fe, Co, Ni, Zr, Mo, Ru, Rh, Ce, W, Ir, and Pt is preferably used. Among the preceding elements, TI, V, Cr, Mn, Fe, Co, Ni, Nb, Mo, Tc, Ru, Rh, Ce, Pr, Eu, Tb, Ta, W, Re, Os, Ir, and Pt are also elements that have at least two oxidation states.

Specific examples of other elements that have at least two oxidation states are Cu, Ga, Ge, As, Se, Br, Pd, Ag, In, Sn, Sb, Te, I, Yb, and Au, wherein the use of at least one element selected from Cu, Ga, Ge, Se, Pd, Ag, and Au is preferred.

The high specific surface area porous cordierite body that is a base material of the ceramic body according to the present invention is constituted of only a needle-shaped crystal phase and assumes a structure that resists the development of sintering and is therefore able to suppress sintering-induced reductions in the specific surface area even during heating at high temperatures. Based on this, a catalyst carrier honeycomb structure can be directly produced from the high temperature-stable, high specific surface area porous cordierite body that is a base material of the ceramic body according to the present invention.

In other words, by virtue of the direct production of a catalyst carrier honeycomb structure from the high temperature-stable, high specific surface area porous cordierite body that is a base material of the ceramic body according to the present invention, it becomes possible to omit steps such as the application of a gamma-alumina coating from the step heretofore used to produce honeycomb structures. This provides a substantial reduction in the cost of producing catalyst carrier honeycomb structures.

The use of the aforementioned high temperature-stable, high specific surface area porous cordierite body in the present invention can eliminate the heretofore problematic deterioration in catalyst quality caused by debonding of the gamma-alumina coating layer during long-term use.

The use the aforementioned high temperature-stable, high specific surface area porous cordierite body in the present invention as catalyst carrier honeycomb structure makes it possible to simplify the process of producing honeycomb catalysts. The high temperature-stable, high specific surface area porous cordierite body of the base material of the ceramic body according to the present invention, because it is constituted of a microfine needle-shaped crystal phase that is at least 1 nanometer but no greater than 0.1 micron, makes it possible to easily support active catalysts such as Pt, Rh, and Pd.

In other words, the use of the aforementioned high temperature-stable, high specific surface area porous cordierite body in the present invention as a catalyst carrier honeycomb structure makes it possible to realize the low-cost production and provision of honeycomb catalysts on which a noble metal catalyst is supported. Since the entire body is constituted of a needle-shaped crystal phase, the porous cordierite body according to the present invention can inhibit sintering-induced diminution of the specific surface area even during heating at high temperatures. In addition, since it can be directly produced as a honeycomb structure with a high specific surface area, it can, for example, be very suitably used as a porous cordierite body for application as a high temperature-stable, high specific surface area catalyst carrier.

Cordierite honeycomb structures having a catalyst supporting capacity and fabricated by the methods described above are very suitable for use, for example, as a ceramic carrier for use with exhaust gas purification catalysts for internal combustion engines. This ceramic carrier can, for example, support at least 0.1 g/L catalyst component in the pores possessed by the cordierite honeycomb structure and can do so without a gamma-alumina coating. This in turn makes it possible to obtain a ceramic catalyst that has a low heat capacity, a high resistance to thermal shock, and a low pressure loss. At least one selection from metals having a catalytic activity and the oxides of metals having a catalytic activity is used as the catalyst component. For example, a noble metal such as, for example, Pt, Pd, Rh, is used as the metal having a catalytic activity, while, for example, an oxide containing at least one metal selected from metals such as V, Nb, Ta, Cr, Mo, W, Mn, Fe, Co, Ni, Cu, Zn, Ga, Sn, Pb, and so forth, is used as the oxide of a metal having a catalytic activity.

Usable as the method of supporting the catalyst component are, for example, liquid-phase methods in which the catalyst component is dissolved in solvent and this is impregnated into the cordierite honeycomb structure in order thereby to support the catalyst component within the pores comprising defects cracks, and so forth; gas-phase methods such as CVD and PVD; and methods that use a supercritical fluid. Since the pores comprising defects, cracks, and so forth formed in the cordierite honeycomb structure are microfine, the use of a medium that easily infiltrates into the interior of the microfine pores, as in gas-phase methods and methods that use supercritical fluids, is more desirable. While water can even be used as the solvent in liquid-phase methods, the use of a solvent that has a lower surface tension than water, for example, an alcohol solvent such as methanol, is preferred. The use of a solvent having a lower surface tension than water enables a thorough permeation into the pores. Infiltration of the solvent into the pores is facilitated when immersion is carried out while applying a vibration or while applying vacuum degassing. The catalyst component can be divided into a plurality of applications of the same composition or different compositions and can be supported until the required amount is achieved. These methods enable a more effective utilization of the pores and enable the support of 0.5 g/L or more catalyst component.

The ceramic catalyst body according to the present invention fabricated as described hereinabove is a ceramic catalyst body that exhibits an excellent purification function, in which, without the formation of a gamma-alumina coating layer on the surface of the ceramic carrier, the required amount of catalyst component is directly supported in narrow gaps. Specifically, it is possible to carry out support until the content of the metal element comprising the catalyst component in the catalyst body carrying the catalyst component reaches at least 0.01 weight %, while the average gap between the catalyst component particles (catalyst component ions, catalyst metal particles, and so forth) supported on the ceramic carrier surface is small at 0.1 to 1000 nm and preferably 0.1 to 100 nm. For the same amount of supported catalyst, this provides a smaller size for and a larger number of the catalyst component particles, which thereby makes possible an efficient manifestation of catalytic function through a high density distribution of catalyst component over the entire surface of the ceramic carrier.

The following special effects are provided by the present invention: 1) the present invention provides a needle-shaped ceramic body and needle-shaped ceramic catalyst body comprising a porous cordierite body that has a high specific surface area; 2) this porous cordierite body, because at least a portion thereof is composed of a needle-shaped crystal phase, resists sintering-induced diminution of the specific surface area even when subjected, for example, to long-term exposure to high temperatures exceeding 1000° C.; 3) a honeycomb can be directly produced as the cordierite sinter itself; 4) this porous body is effective as a catalyst carrier cordierite honeycomb structure that is stable at high temperatures and that has a high specific surface area; 5) the prior-art step of coating the interior of the honeycomb can be omitted 6) a novel production technology is provided that can produce a high-quality honeycomb at low cost; and 7) products according to the present invention are free of the problems associated with prior-art methods, for example, in the case of products in which gamma-alumina has been coated on the interior walls of a cordierite honeycomb, the problems at high temperatures at or above 1000° C. with the transformation of gamma-alumina to alpha-alumina and the difficulty of maintaining a high specific surface area due to the advance of sintering.

BEST MODE FOR CARRYING OUT THE INVENTION

The present invention is specifically described hereinbelow based on examples, but the present invention is in no way limited by the examples that follow.

EXAMPLE 1

(1) Preparation of a submicron cordierite bulk

High-purity kaolin, talc, alumina, and silica powders were used as starting materials. Kaolin is a general term for compound oxides in which the main components are alumina, silica, and magnesia. The compositions of the kaolin and talc used in this example were as follows, in each case expressed as the molar ratio: the kaolin composition was $Al_2O_3 : SiO_2 : MgO : K_2O : Fe_2O_3$=34.69 : 50.64 : 0.47 : 2.49 : 1.08; the talc composition was $SiO_2 : MgO$=62.85 : 31.33.

The starting kaolin, talc, alumina, and silica powders were weighed out and blended, respectively, at 34.5 weight %, 40.4 weight %, 20.6 weight %, and 4.5 weight % as the weight proportions so as to give the cordierite composition. In addition with the goal of lowering the cordierite production temperature, 3 weight % boron oxide ($B_2O_3$) was a added to these starting powders. It was confirmed by x-ray diffraction measurements that the $B_2O_3$ addition reduced the cordierite production temperature to 1100° C. The present inventors have confirmed that the cordierite production temperature is reduced by the addition of 3 weight % or less $B_2O_3$ or cerium oxide ($CeO_2$).

For the purpose of growing whiskers, 2 weight % strontium oxide (SrO) was also added to the starting powder. The present inventors have discovered that the same effect is provided by the addition of up to 2 weight % alkali metal oxide or up to 5 weight % rare-earth oxide.

With the goal of raising the post-sintering porosity of the sinter, 10, 20, or 30 weight % carbon black was added to the mixed powder comprising the aforementioned starting powders and additives; this was followed by mixing for 12 hours in alcohol in a ball mill.

The resulting mixed slurry was dried in a rotary evaporator held at 75° C. and then dried for 24 hours in an oven held at 110° C. The dried material was ground with a mortar and classified to no more than 100 microns.

The resulting powder was compression molded and sintered for hours at 1300° C. in air. The porosity of the sinter varied as a function of the amount of carbon black initially added, but all of the sinters had porosities of 38 to 55%.

(2) Fabrication of a high specific surface area porous cordierite body by treatment with a weak acid A porous structure was obtained by carrying out treatment with a weak acid with the goal of boosting the specific surface area. The present inventors have confirmed that nanoscale whiskers can be formed by the use of a weak acid. This example used oxalic acid ($(COOH)2$) as the weak acid.

The acid treatment conditions of acid concentration and the time were varied in this example. Four acid concentrations were used, i.e., 0.25, 0.5, 1.0, and 1.5 normal, and times of 1, 3 and 7 hours were used for each acid concentration.

After the acid treatment, the resulting porous structure was washed with distilled water and then dried for 24 hours in an oven held at 110° C. The specific surface area was measured after drying.

With some of the samples, heat treatment in the atmosphere for 24 hours at 1100° C. was carried out with the goal of evaluating the decline in specific surface area induced by exposure to high temperatures of 1000° C. or more.

(3) Results

Figure 1:
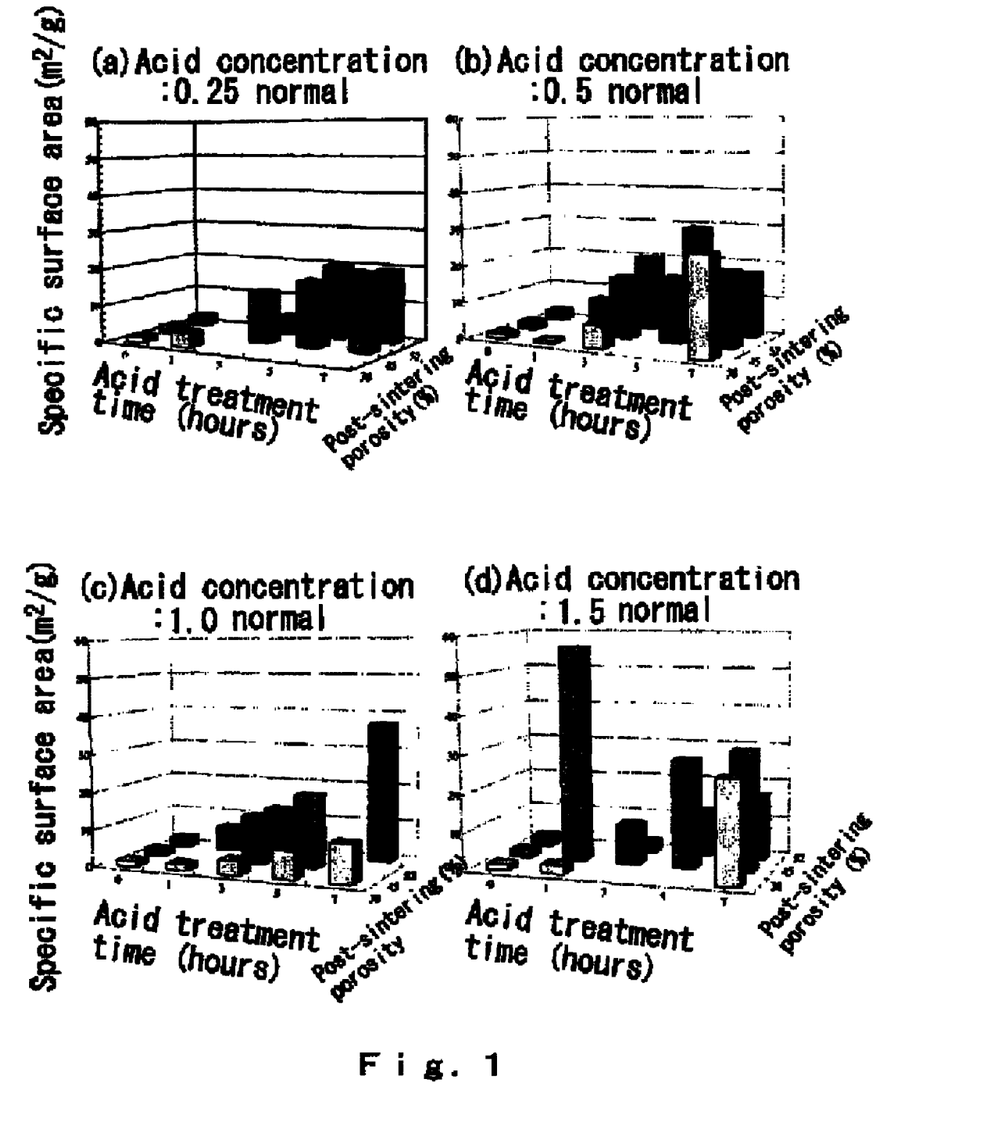
FIG. 1 shows the relationships between the specific surface area and the acid treatment time and post-sintering porosity.

The relationship between the specific surface area and the acid treatment time and post-sintering porosity are shown in FIGS. 1(a), (b), (c), and (d) show, respectively, the results for acid concentrations of 0.25, 0.5, 1.0, and 1.5 normal. While a general trend is not present, the specific surface area after acid treatment depends to a large degree on the acid treatment time and the post-sintering porosity. It is seen that the specific surface area can be increased up to 50 m²/g or more depending on the conditions, as for the sample in FIG. 1(d) at an acid treatment time of 1 hour and a post-sintering porosity of 45%.

Figure 2:
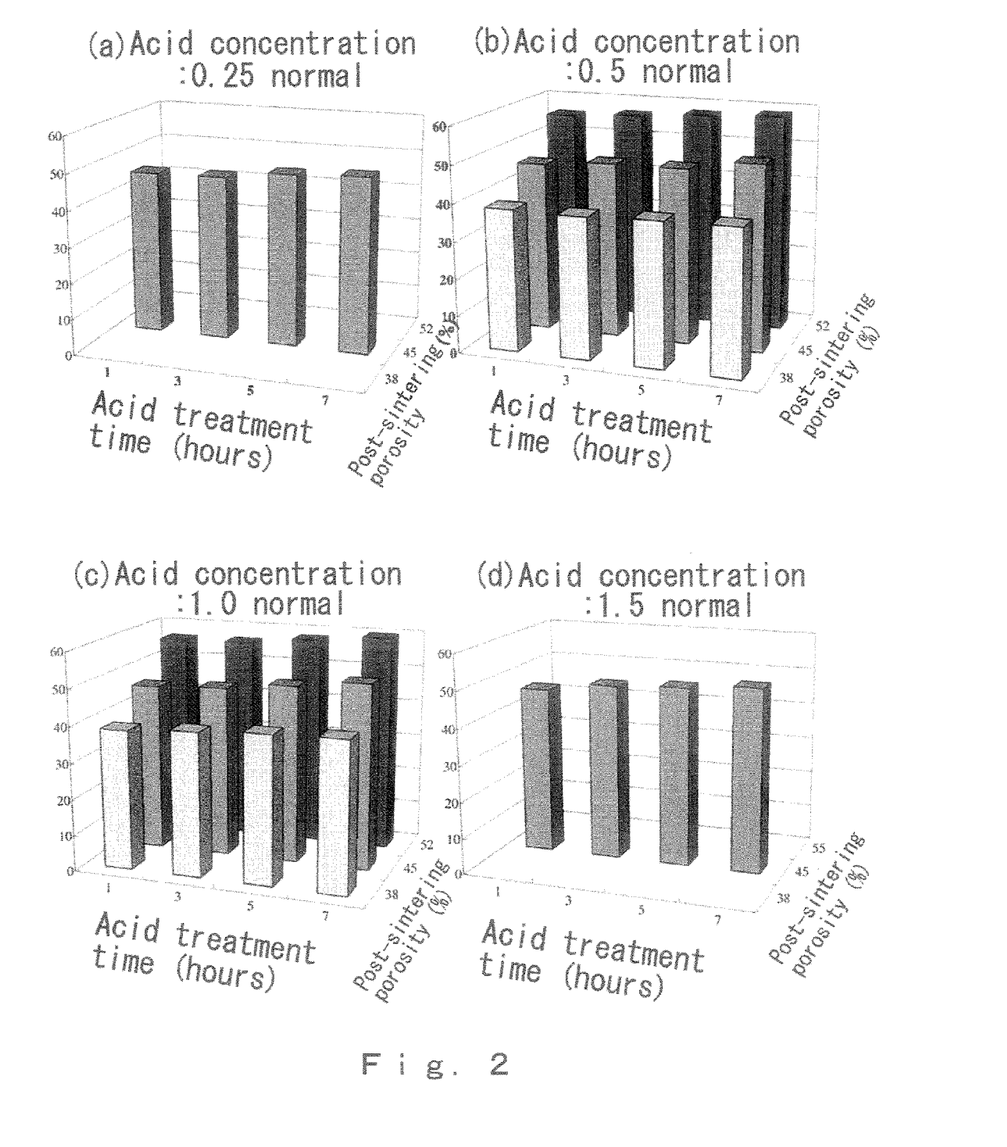
FIG. 2 shows the relationships between the porosity after acid treatment and the acid treatment time and post-sintering porosity.

The relationships between the porosity after acid treatment and the acid treatment time and post-sintering porosity are shown in FIG. 2, FIGS. 2(a), (b), (c), and (d) show, respectively, the results for acid concentrations of 0.25, 0.5, 1.0 ad 1.5 normal. It is demonstrated that for all the samples there was no major change in porosity as a function of the acid treatment.

Figure 3:
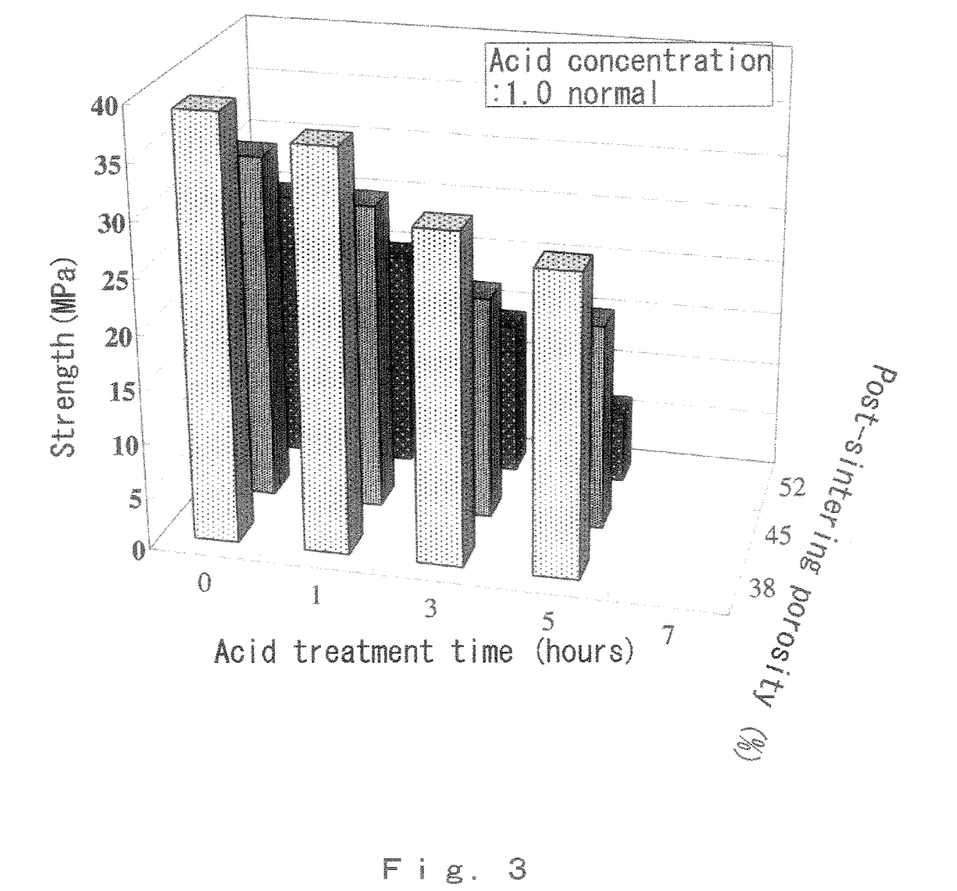
FIG. 3 shows the relationships between strength and the acid treatment time and post-sintering porosity.

The relationships between strength and the acid treatment time and post-sintering porosity are shown in FIG. 3. The acid concentration used in the acid treatment in this case was 1.0 normal. A trend is seen in which the strength gradually declines as the acid treatment time lengthens, and a trend is also seen in which the strength declines as the post-sintering porosity increases.

Figure 4:
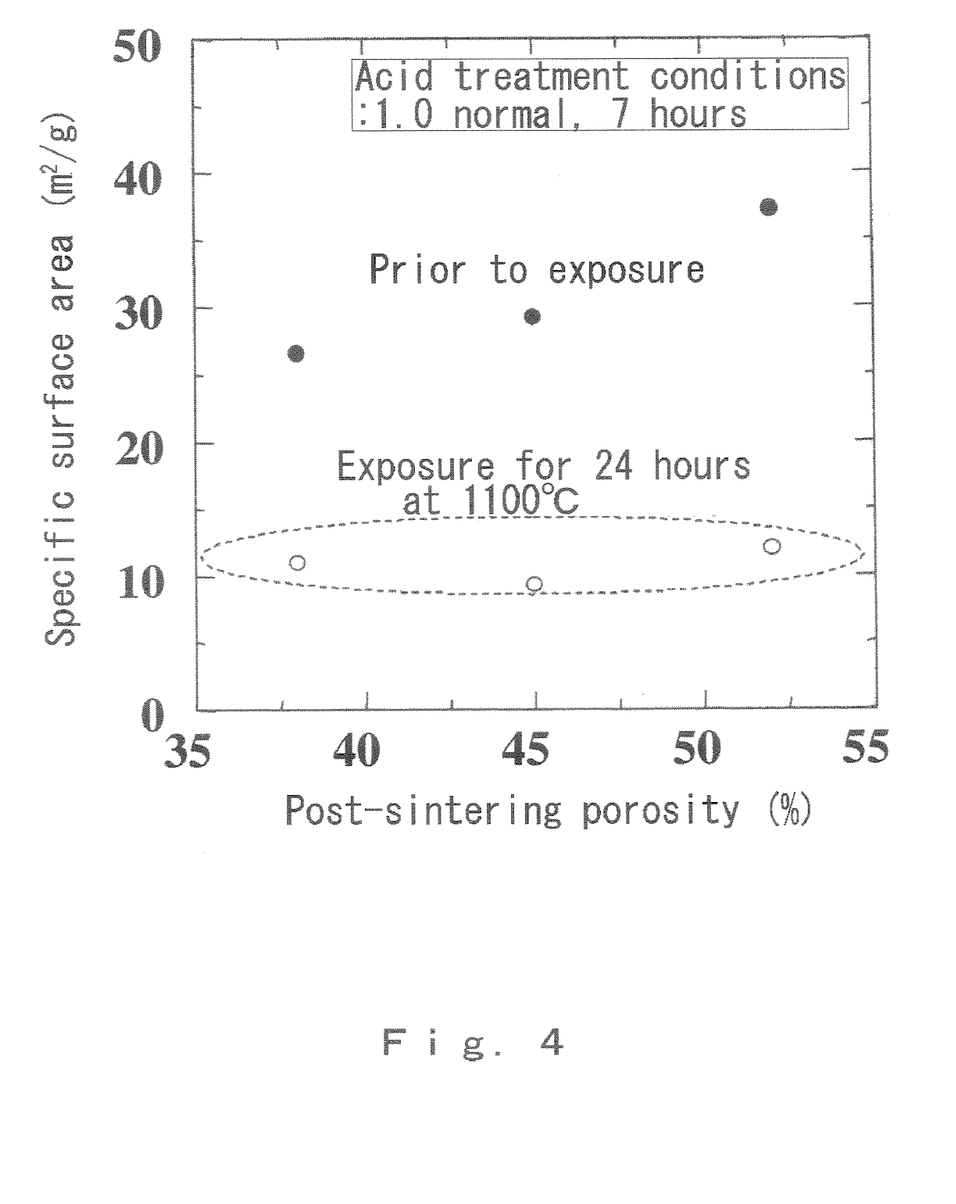
FIG. 4 shows the results of a thermal exposure evaluation.

The results of a thermal exposure evaluation at 1100° C. are shown in FIG. 4 for a sample treated for 7 hours with 1.0 normal oxalic acid. The heat treatment conditions were 24 hours in the atmosphere. Regardless of the differences in porosity the specific surface area of each sample in the case of treatment at 1100° C. was constant at approximately 10 m²/g. It is known that the high specific surface area porous cordierite bodies known to date, when heated for 12 hours at 1050° C., which is a temperature lower than that used in this example a undergo a sintering-induced decline in their specific surface area. The porous cordierite body according to the present invention, as a consequence of being composed of only needle-shaped crystals, is seen to demonstrate a substantial inhibition of the decline in specific surface area induced by exposure to heat. From this it can be concluded that the high specific surface area porous cordierite body according to the present invention is more stable at high temperatures than the heretofore known high specific surface area porous cordierite bodies.

As described hereinabove, it was confirmed that, through treatment of the aforementioned cordierite bulk with weak acid, a novel high specific surface area porous cordierite body can be fabricated that has a structure in which the surface is covered with a nanoscale needle-shaped crystal phase; the production of the nanoscale needle-shaped crystal phase can be changed by means of the type of weak acid, the concentration of the weak acid, and/or the treatment time; and the obtained porous cordierite body is stable at high temperatures.

EXAMPLE 2

(1)Fabrication of a ceramic honeycomb carrier formed of needle-shaped particles

Using talc, fused silica, alumina, aluminu hydroxide, and kaolin, a compound of $SiO_2$ and $Al_2O_3$, as the starting materials for conversion to cordierite, and using $WO_3$ to replace 10% of the Al source with W with its different valence, the powders of these starting materials were compounded so as to provide approximately the theoretical cordierite composition. To this starting compounded material were added 2 wt % SrO as an acicularization additive as well as suitable quantities of binder, lubricant, humectant, and so forth, followed by mixing/kneading a typical method and then molding into a honeycomb shape with a cell wall of 100 μm, a cell density of 400 cpsi (cells per square inch), and a diameter of 50 mm. The resulting honeycomb molding was dried and then fired at 1260° C. in an air atmosphere to give a fired ceramic that had lattice defects. This fired body was treated for 3 hours in 1 normal oxalic acid ($(COOH)_2$) at 80° C. and was thereafter thoroughly washed with pure water yielding a direct-supporting ceramic carrier according to the present invention. SEM inspection confirmed that needle-shaped particles had been obtained. This was confirmed to be cordierite by x-ray diffraction. Table 1 shows the results of measurement of the length, diameter, and aspect ratio of the particles and the specific surface area, porosity, thermal expansion coefficient, and crush strength the flow channel direction of the honeycomb.

(2) Fabrication of a ceramic catalyst body

Figure 5:
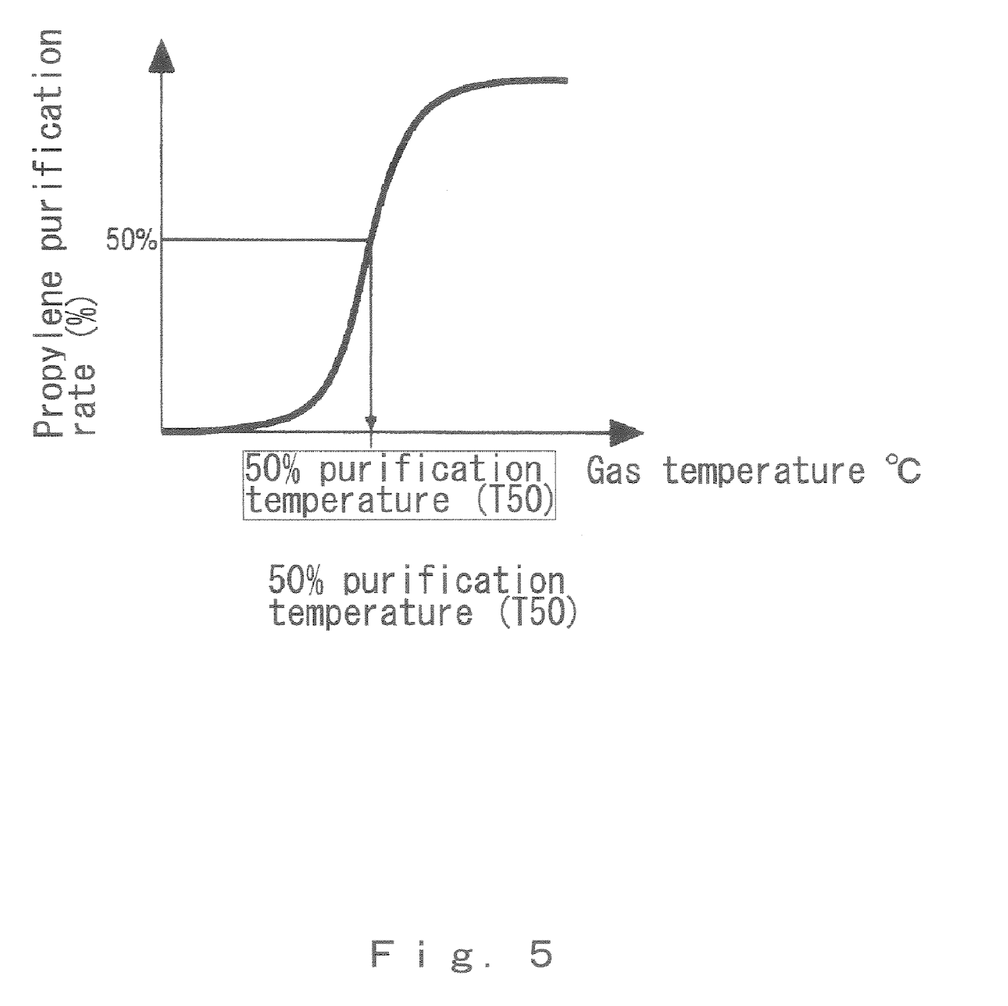
FIG. 5 shows the 50% purification temperature (T50).

The direct-supporting ceramic carrier prepared as described above was immersed for 5 minutes in an aqueous solution in which 0.035 mol/L chloroplatinic acid and 0.025 mol/L rhodium chloride were dissolved, followed by removal of the excess solution and then drying. Metallization was carried out by baking this at 600° C. in an air atmosphere. The catalyst was supported at Pt/Rh=1.0/0.2 g/L. The purification capacity of the resulting ceramic catalyst body was evaluated. The evaluation conditions are provided below, under which the 50% purification temperature (new contact T50) for propylene ($C_3H_6$) was measured. The 50% purification temperature T50) is the temperature at which the propylene purification rate is 50% (FIG. 5). As thermal durability test was also carried out for 5 hours at 800° C. in an air atmosphere after which high the 50% purification temperature (aged contact T50) was again measured. The results of the evaluation of the 50% purification temperatures are shown in Table 2.

(Evaluation conditions)

ceramic carrier: 35 cc (Φ30×L50)

SV: 41000/HR gas composition: A/F=14.55

EXAMPLE 3

(1) Fabrication of a ceramic carrier

Using talc, fused silica, alumina, aluminu hydroxide, and kaolin, a compound of $SiO_2$ and $Al_2O_3$, as the starting materials for conversion to cordierite, and using $WO_3$ corresponding to 5% of the Si source and similarly using CoO corresponding to 5% of the Si source, the powders of these starting materials were compounded so as to provide approximately the theoretical cordierite composition. To this starting compounded material were added 2 wt % SrO as an acicularization additive as well as suitable quantities of binder, lubricant, humectant, and so forth, followed by mixing/kneading by a typical method and then molding into a honeycomb shape with a cell wall of 100 μm, a cell density of 400 cpsi (cells per square inch), and a diameter of 50 mm. The resulting honeycomb molding was dried and then fired at 1260° C. in an air atmosphere to give a direct-supporting ceramic carrier according to the present invention. SEM inspection confirmed that needle-shaped particles had been obtained. This was confirmed to be cordierite by x-ray diffraction. Table 1 shows the results of measurement of the length, diameter, and aspect ratio of the particles and the specific surface area, porosity, thermal expansion coefficient, and crush strength in the flow channel direction of the honeycomb.

catalyst was supported at Pt/Rh=1.0/0.2 g/L. The purification capacity of the resulting ceramic catalyst body was evaluated. The evaluation conditions were the same as in Example. The results of the evaluation of the 50% purification temperatures are shown in Table 2.

TABLE 1

Individual properties for the examples

|  | particle length (μm) | particle diameter (μm) | aspect ratio | specific surface area (m²/g) | porosity (%) | coefficient of thermal expansion (×10⁻⁶/°C.) | crush strength in the flow channel direction (MPa) |
|---|---|---|---|---|---|---|---|
| Ex. 1 | 1.57 | 0.16 | 9.8 | 32 | 32 | 0.8 | 8 |
| Ex. 2 | 1.14 | 0.20 | 5.7 | 6 | 48 | 1.2 | 13 |
| Comp. Ex. 1 | 5.60 | 2.00 | 2.8 | 0.3 | 34 | 0.7 | 14 |

(2) Fabrication of a ceramic carrier body

The direct-supporting ceramic carrier prepared as described above was immersed for 5 minutes in an aqueous solution in which 0.035 mol/L chloroplatinic acid and 0.025 mol/L rhodium chloride were dissolved, followed by removal of the excess solution and then drying. Metallization was carried out by baking this at 600° C. in an air atmosphere. The catalyst was supported at Pt/Rh=1.0/0.2 g/L. The purification capacity of the resulting ceramic catalyst body was evaluated. The evaluation conditions were the same as in Example 2. The results of the evaluation of the 50% purification temperatures are shown in Table 2.

COMPARATIVE EXAMPLE 1

Using talc, fused silica, alumina and aluminu hydroxide as the starting materials for conversion to cordierite, and using WO₃ corresponding to 5% of the Si source and similarly using CoO corresponding to 5% of the Si source, the powders of these starting materials were compounded so as to provide approximately the theoretical cordierite composition. To this starting compounded material were added suitable quantities of binder, lubricant, humectant, and so forth, followed by mixing/kneading by a typical method and then molding into a honeycomb shape with a cell wall of 100 μm, a cell density of 400 cpsi (cells per square inch) and a diameter of 50 mm. The resulting honeycomb molding was dried and then fired at 1260° C. in an air atmosphere to give a direct-supporting ceramic carrier that contained a substitute element capable of direct support. According to SEM inspection, needle-shaped particles were not present while column-shaped particles were present. This was confirmed to be cordierite by x-ray diffraction. Table 1 shows the results of measurement of the length, diameter, and aspect ratio of the particles and the specific surface area, porosity thermal expansion coefficient, and crush strength in the flow channel direction of the honeycomb. The direct-supporting ceramic carrier prepared as described above was immersed for 5 minutes in an aqueous solution in which 0.35 mol/L chloroplatinic acid and 0.025 mol/L rhodium chloride were dissolved, followed by removal of the excess solution and then drying. Metallization was carried out by baking this at 600° C. in an air atmosphere. The

TABLE 2

Results of evaluation of the 50% purification temperature

|  | new contact T50 (° C.) | aged contact T50 (° C.) |
|---|---|---|
| Example 1 | 242 | 254 |
| Example 2 | 248 | 256 |
| Comparative Example 1 | 255 | 265 |

Needle-shaped cordierite with an aspect ratio of at least 5 was obtained in Examples 1 and 2 by the use of kaolin, a compound of $SiO_2$ and $Al_2O_3$, and by the use of an acicularization additive; however, columnar cordierite with an aspect ratio less than 5 was obtained in Comparative Example 1 because neither kaolin nor an acicularization additive was used. In Examples 1 and 2, in which needle-shaped cordierite was obtained, the specific surface area was at least 1 m²/g, while in Comparative Example 1 the specific surface area assumed a small value less than 1 m²/g. With regard to the 50% purification temperature, the new contact T50 was smaller in Examples 1 and 2 due to the larger specific surface area than in Comparative Example 1, demonstrating an improved performance for the former.

INDUSTRIAL APPLICABILITY

As described hereinabove, the present invention relates to a needle-shaped ceramic body, a needle-shaped ceramic catalyst body, and methods for making the preceding. The present invention enables, for example, the production and provision, by means of treatment with weak acid, of a high specific surface area porous cordierite body that has a structure in which nanoscale needle-shaped crystals are deposited. Control to suitable treatment conditions can he exercised in this case through the type of acid, the acid concentration, and/or the treatment time. Because the entire porous cordierite body comprising a base material of the ceramic body is constituted of a needle-shaped crystal phase, sintering-induced diminution of the specific surface area can be substantially inhibited, even upon heat in at high temperatures. Based on this fact, for example, the step of applying a coating of gamma-alumina to the interior walls of the honeycomb can be omitted from the production of a catalyst carrier cordierite honeycomb structure. A technology that produces a high temperature-stable, high specific surface area cordierite honeycomb is provided. The present invention provides a needle-shaped ceramic body comprising a high specific surface area porous cordierite body, a method for manufacturing this needle-shaped ceramic body, and a needle-shaped ceramic catalyst body as an article of manufacture therefrom, and is therefore useful as an invention that introduces novel technology in the concerned technical field.

The invention claimed is:

1. A ceramic body having a high specific surface area, comprising at least one ceramic particle, wherein the ceramic particle comprises at least Si, Al, and Mg and has a needle-shaped morphology; the ceramic body comprises a porous cordierite body that is stable at a high temperature and has a high surface area; the porous body as a whole comprises a needle-shaped crystal phase; the ceramic particle has a three-dimensional bonding of needle-shaped crystals formed by treatment with weak acid at a stage in which the needle-shaped crystal is deposited and thereby has a high specific surface area of at least 1 $m^2/g$; and the ceramic particle resists sintering-induced diminution of the specific area when being subjected to the high temperature of 1000° C. or more.

2. The ceramic body according to claim 1, wherein the needle-shaped particle comprises Si, Al, and Mg and at least one species of Sr and Ce.

3. The ceramic body according to claim 1, wherein the needle-shaped particle is cordierite.

4. The ceramic body according to claim 3, wherein at least five unit crystal lattice units from the surface of the needle-shaped particle are cordierite.

5. The ceramic body according to claim 1, wherein the aspect ratio of the needle-shaped particle is at least 5.

6. The ceramic body according to claim 1, wherein the ceramic body has a form of particles, pellets, a nonwoven fabric, or a honeycomb.

7. The ceramic body according to claim 6, comprising a ceramic honeycomb with a porosity of at least 10%.

8. The ceramic body according to claim 6, wherein the porosity of the ceramic body is at least 30%.

9. The ceramic body according to claim 6, comprising a ceramic honeycomb that has a coefficient of thermal expansion in the flow channel direction of not more than $2\times10^{-6}/°$C.

10. The ceramic body according to claim 6, comprising a ceramic honeycomb that has a coefficient of thermal expansion in the flow channel direction of not more than $1\times10^{-6}/°$C.

11. The ceramic body according to claim 6, comprising a ceramic honeycomb that has a crush strength in the flow channel direction of at least 5 MPa.

12. The ceramic body according to claim 6, comprising a ceramic honeycomb that has a crush strength in the flow channel direction of at least 10 MPa.

13. The ceramic body according to claim 6, comprising a ceramic honeycomb that has a cell wall thickness of not more than 400 μm.

14. The ceramic body according to claim 13, comprising a ceramic honeycomb that has a cell wall thickness of not more than 100 μm.

15. The ceramic body according to claim 6, comprising a ceramic honeycomb that has a narrow pore distribution width.

16. The ceramic body according to claim 15, wherein at least 50% of the pore volume is encompassed by the distribution width within ±½ of the value of the average pore diameter.

17. The ceramic body according to claim 1, wherein the specific surface area of the ceramic body is at least 1 $m^2/g$.

18. A ceramic catalyst body comprising the ceramic body according to claim 1 which supports a catalyst component.

19. The ceramic catalyst body according to claim 18, wherein the catalyst component is a noble metal.

20. The ceramic catalyst body according to claim 19, wherein the amount of supported catalyst component is at least 0.1 g per liter.

21. The ceramic catalyst body according to claim 18 which further comprises a co-catalyst component.

22. The ceramic catalyst body according to claim 21, wherein the co-catalyst component is at least one selected from the group consisting of lanthanoid elements, transition metal elements, alkali metal elements, alkaline-earth metal elements, their oxides and compound oxides.

23. The ceramic catalyst body according to claim 22, wherein the co-catalyst component content is at least 6 g per liter.

24. A ceramic body having a high specific surface area in which at least one ceramic particle comprises at least Si, Al, and Mg and has a needle-shaped morphology, wherein at least one selected from the group consisting of pores and elements capable of directly supporting a catalyst component is present on the surface of the ceramic particle; the ceramic body comprises a porous cordierite body that is stable at a high temperature and has a high surface area; the porous body as a whole comprises a needle-shaped crystal phase; the ceramic particle has a three-dimensional bonding of needle-shaped crystals formed by treatment with weak acid at a stage in which the needle-shaped crystal is deposited and thereby has a high specific surface area of at least 1 $m^2/g$; and the ceramic particle resists sintering-induced diminution of the specific area when being subjected to the high temperature of 1000° C. or more.

25. The ceramic body according to claim 24, wherein the pores comprise at least one selected from the group consisting of defects in the crystal lattice of the ceramic particles, microcracks at the surface of the ceramic particles, and a deficiency of an element that constitutes the ceramic particle.

26. The ceramic body according to claim 25, comprising microcracks having a width not greater than 100 nm.

27. The ceramic body according to claim 25, wherein the pores have a diameter or width that is not more than 1000 times the diameter of the catalyst ion to be supported and the pore number thereof is at least $1\times10^{11}$ per liter.

28. The ceramic body according to claim 25, wherein the pores comprise defects formed by the replacement of a portion of a constituent element of the ceramic particle with a metal element that has a different valence.

29. The ceramic body according to claim 28, wherein the defects comprise at least one selected from the group consisting of oxygen defects and lattice defects and the ceramic body comprises at least $4\times10^{-6}$% ceramic crystals having at least one defect in the unit crystal lattice of the needle-shaped particle.

30. The ceramic body according to claim 24, wherein at least one element or more constituting the needle-shaped particle of the ceramic body is substituted by an element other than a constituent element and the ceramic body is capable of directly supporting a catalyst component by the substitute element.

31. The ceramic body according to claim 30, wherein the catalyst component is supported on the substitute element by chemical bonding.

32. The ceramic body according to claim 30, wherein the substitute element is at least one element or more that has a d or f orbital in electron orbitals thereof.

33. A ceramic body having a high specific surface area, wherein at least a portion of the surface of the ceramic body is coated with at least one ceramic particle that comprises at least Si, Al, and Mg and have a needle-shaped morphology;

the ceramic body comprises a porous cordierite body that is stable at a high temperature and has a high surface area; the porous body as a whole comprises a needle-shaped crystal phase;

the ceramic particle has a three-dimensional bonding of needle-shaped crystals formed by treatment with weak acid at a stage in which the needle-shaped crystal is deposited and thereby has a high specific surface area of at least 1 $m^2/g$; and the ceramic particle resists sintering-induced diminution of the specific area when being subjected to the high temperature of 1000° C. or more.

34. A ceramic body having a high specific surface area in which at least a portion of the surface of the ceramic body is coated with at least one ceramic particle that comprise at least Si, Al, and Mg and have a needle-shaped morphology, wherein at least one selected from the group consisting of pores and elements capable of directly supporting a catalyst component is present on the surface of the ceramic particles; the ceramic body comprises a porous cordierite body that is stable at a high temperature and has a high surface area; the porous body as a whole comprises a needle-shaped crystal phase; the ceramic particle has a three-dimensional bonding of needle-shaped crystals formed by treatment with weak acid at a stage in which the needle-shaped crystal is deposited and thereby has a high specific surface area of at least 1 $m^2/g$; and the ceramic particle resists sintering-induced diminution of the specific area when being subjected to the high temperature of 1000° C. or more.

* * * * *